United States Patent [19]
Gall et al.

[11] 3,931,114
[45] Jan. 6, 1976

[54] POLYBUTYLENE TEREPHTHALATE BLOW MOLDED ARTICLE

[75] Inventors: John S. Gall, North Haledon; George W. Halek, Summit, both of N.J.

[73] Assignee: Celanese Corporation, New York, N.Y.

[22] Filed: Jan. 17, 1974

[21] Appl. No.: 434,455

Related U.S. Application Data
[62] Division of Ser. No. 261,847, June 12, 1972, Pat. No. 3,814,786.

[52] U.S. Cl. .................................................. 260/75 T
[51] Int. Cl.² ................... C08G 63/70; C08G 63/16
[58] Field of Search .......................... 260/75 T, 75 R

[56] References Cited
UNITED STATES PATENTS

| | | | |
|---|---|---|---|
| 3,329,653 | 7/1967 | Beavers et al. | 260/47 |
| 3,624,024 | 11/1971 | Caldwell et al. | 260/40 R |
| 3,706,111 | 12/1972 | Curtin et al. | 260/75 R |
| 3,733,309 | 5/1973 | Wyeth et al. | 260/75 T |
| 3,745,150 | 7/1973 | Corsover | 260/75 T |
| 3,822,332 | 7/1974 | Hrach | 260/75 T X |

FOREIGN PATENTS OR APPLICATIONS

| | | |
|---|---|---|
| 902,821 | 6/1972 | Canada |

*Primary Examiner*—Harold D. Anderson
*Assistant Examiner*—W. C. Danison, Jr.
*Attorney, Agent, or Firm*—Thomas J. Morgan; Linn I. Grim; Marvin Bressler

[57] ABSTRACT

Blow molded polybutylene terephthalate articles and a process for making them. A polybutylene terephthalate melt at a temperature in the range of the melt temperature of polybutylene terephthalate and 495°F., and having an intrinsic viscosity of at least 1.05 deciliters per gram is blow molded in an extrusion blow molding apparatus the mold of which is maintained at a temperature of less than 150°F. to produce polybutylene terephthalate blown articles possessing excellent strength characteristics. Bottles, especially aerosol pressurized bottles, are a primary application of the type of articles produced by this process.

4 Claims, No Drawings

POLYBUTYLENE TEREPHTHALATE BLOW MOLDED ARTICLE

This is a division of application Ser. No. 261,847 filed June 12, 1972, now U.S. Pat. No. 3,814,786.

BACKGROUND OF THE DISCLOSURE

1. Field of the Invention

The instant invention is directed to blow molded articles and a process for forming them. More specifically, the instant invention is directed to polybutylene terephthalate blow molded articles and a process for forming them. Still more specifically, the instant invention is directed to polybutylene terephthalate injection blow molded articles and the process for forming them.

2. Background of the Invention

Work in the polyester field has accelerated in recent years. Among the more dramatic developments in polyester research has been the discovery that polybutylene terephthalate may be successfully molded. Furthermore, these polybutylene terephthalate molding resins have been found to be surprisingly superior to polyethylene terephthalate in many important molding applications. This has led to extensive development work in the area of polybutylene terephthalate injection molded articles and processes for forming them. As a result of these developments, it has been found the polybutylene terephthalate molding resins, which were first disclosed, along with polyethylene terephthalate, in U.S. Pat. No. 2,465,319 to Winfield and Dickson, solve many processing problems long associated with polyethylene terephthalate and believed, by those skilled in the art, to be equally associated with all polyalkylene terephthalate.

Although polybutylene terephthalate resins have been found to possess excellent properties as an injection molded resin, it was heretofore limited to this molding procedure. Because of the relatively low viscosity of polybutylene terephthalate melts, a prime market for polybutylene terephthalate, as blow molding resins, has not been exploited. This market is large and continues to grow. It includes such blow molded articles as containers, bottles and the like. Especially important in this market is blow molded bottles designed to withstand extensive pressures, i.e., bottles containing aerosol fluids. In the past polybutylene terephthalate parisons, because of their relatively low viscosity, did not retain their shape for the time necessary to be enclosed within the blow mold. Furthermore, even in those cases when satisfactory parisons were formed, the resultant blow molded articles, i.e., blow molded bottles, did not possess sufficient strength to meet the requirements of the marketplace.

BRIEF SUMMARY OF THE INVENTION

The instant invention is directed to a blow molded polybutylene terephthalate article having sufficient strength for utilization in many engineering applications. Among these applications are the use of these articles as containers, bottles and the like and especially as aerosol bottles.

The instant invention is also directed to a process for forming the blow molded polybutylene terephthalate articles of the instant invention.

In accordance with the instant invention a blow molded polybutylene terephthalate article is provided. The blow molded polybutylene terephthalate of the instant invention has an intrinsic viscosity of at least 1.05 deciliters per gram.

The instant invention is also directed to a process for making a blow molded polybutylene terephthalate article in which the polybutylene terephthalate article has an intrinsic viscosity of at least 1.05 deciliters per gram. In accordance with this process a polybutylene terephthalate melt, at a temperature in the range of between the melt temperature of the polybutylene terephthalate and 495°F., is formed. The melt is extruded into parisons which are blow molded in a mold maintained at a temperature of below 150°F. The blow molded article is formed upon the release of the blow molded article from the mold.

DETAILED DESCRIPTION

Polybutylene terephthalate used in the instant invention to produce blow molded articles can be produced by the reaction product of terephthalic acid or a dialkyl ester of terephthalic acid (especially dimethyl terephthalate), and diols having 4 carbon atoms.

In the instant invention it is preferred to react the dialkyl ester of terephthalic acid, in which the alkyl radical can contain from 1 to 7 carbon atoms, with about two molecular proportions of the diol described above. The result of this reaction is the intermediate, bis (hydroxyalkyl) terephthalate. It should be appreciated that the use of more than equimolar proportions of the diol, i.e., in excess of 1.5 moles of the diol per mole of the terephthalate derivative, is employed in the initial transesterification reaction, since by using such proportions the reaction is caused to take place more rapidly and completely.

The reaction occurs under conditions of elevated temperature at atmospheric, subatmospheric or superatmospheric pressure. The preferred temperature range for the reaction is from about the boiling temperature of the reaction mixture to as high as 275°C. In this temperature range the bis (hydroxyalkyl) terephthalate is polymerized to form the polybutylene terephthalte product.

Polybutylene terephthalate resin formed by the method described above is unexpectedly blow moldable into blow molded articles by the process of the instant invention. That polybutylene terephthalate may be blow molded into blow molded articles such as bottles, containers and the like is unexpected in view of the inability of polyethylene terephthalate to be so processed. This unexpected result occurs because polyethylene terephthalate is far more amorphous than polybutylene terephthalate. A molded article requires a significant degree of crystallization in order to be formed into a shaped article of sufficient strength to meet the requirements of the marketplace.

The ability of polybutylene terephthalate to be formed into blow molded articles is even more unexpected because of the tendency, in the past, of polybutylene terephthalate melts to not form into stable parisons for a time long enough to permit the mold to enclose the parison. Furthermore, polybutylene terephthalate resins, even when blow moldable, in the past, did not form into sufficiently strong blow molded articles to be competitive with blow molded articles of other moldable plastics.

It has now been found that by employing a polybutylene terephthalate resin of sufficiently high molecular weight, parisons may be formed which maintain their shape for a sufficiently long period of time to be enclosed in a blow molding apparatus and formed into a blow molded article. Furthermore, it has now been found that if both the temperature of the polybutylene terephthalate melt as well as the mold are sufficiently low, the final product, the blow molded article, will possess sufficient strength to be employed in applications for which blow molded articles are ideally suited.

In the instant invention, polybutylene terephthalate resin having an intrinsic viscosity of at least 1.05 deciliters per gram, measured in orthochlorophenol at 25°C., is employed. More preferably, the intrinsic viscosity of the polybutylene terephthalate melt is in the range of between 1.1 and 1.4 deciliters per gram, measured in orthochlorophenol at 25°C.

The polybutylene terephthalate melt having an intrinsic viscosity in the range described above is continuously extruded through a single or double cross head die. The material extruded through the die has a hollow cylindrical shape called a parison. A split die, positioned on either side of the parison closes around the parison. A hot knife severs the parison between the top of the closed mold and the cross head die. The closed mold moves horizontally out from the extruder to a blowing station. At the blowing station a mandrel is sent into the top of the mold and thence into the parison, air is then introduced through the mandrel which blows the parison into the shape of the mold. The blown article is thereby formed. After cooling, the mandrel retracts, the air is evacuated, the mold opens and the molded article is ejected. This procedure is repeated until the entire polybutylene terephthalate charge is formed into blow molded articles.

It should be appreciated that the above description of the blow molding operation is illustrative of extrusion blow molding. Other apparatuses employing extrusion blow molding procedures may, of course, be substituted with correspondingly satisfactory results.

In the procedure described above it is preferable that the temperature of the polybutylene terephthalate melt be in the range of about the melting temperature of polybutylene terephthalate, i.e., about 445°F., to about 495°F. More preferably, the temperature of the melt, extruded to form parisons, is in the range of between the melting temperature of polybutylene terephthalate and 485°F. Still, more preferably, the melt temperature of the polybutylene terephthalate is in the range of about the melt temperature of polybutylene terephthalate and 475°F. The temperature of the mold which encloses the parison and in which the blown article is formed is also critical to the satisfactory production of polybutylene terephthalate blow molded articles. This temperature is preferably not higher than 150°F. More preferably, the mold temperature is 120°F. or below. Still more preferably, the mold temperature is no higher than 100°F.

The following examples illustrate the polybutylene terephthalate blow molded articles of the instant invention. They, furthermore, illustrate the process by which these articles are formed.

EXAMPLE I

A polybutylene terephthalate melt having an intrinsic viscosity of 1.0 deciliter per gram, as measured in orthochlorophenol at 25°C., was processed in a blow molding apparatus of the type described above. The temperature of the melt was about 460°F. and the temperature of the mold was maintained at approximately 90°F. The attempt to form blow molded articles by the blow molding procedure described above was unsuccessful because the polybutylene terephthalate melt lacked sufficient strength to form a stable parison. It was concluded that a polybutylene terephthalate melt having an intrinsic viscosity of 1.0 deciliter per gram could not be employed for blow molding purposes.

EXAMPLE II

A polybutylene terephthalate melt having an intrinsic viscosity of 1.1 deciliters per gram, as measured in orthochlorophenol at 25°C., was extruded through a crosshair die to form parisons. The melt was maintained at a temperature of 460°F., which provided good parison control. The parisons were blow molded by the procedure described above in a mold maintained at a temperature of about 70°F. Below molded containers were formed having a wall thickness suitable for bottle applications.

Example II indicates that polybutylene terephthalate having an intrisic viscosity of 1.1 is suitable as a blow molding plastic.

EXAMPLE III

A polybutylene terephthalate melt having an intrinsic viscosity of 1.3 deciliters per gram, as measured in orthochlorophenol at 25°C., was extruded through a crosshaired die of the type described above to form parisons. The melt was maintained at a temperature of 465°F. while the mold temperature was kept at 70°F. The parisons were blow molded into bottles by the same procedure as that used to form the bottles of Example II. Good parison control was maintained throughout the test. The formed bottles had a uniform wall thickness within the limits required for use as aerosol containers.

EXAMPLE IV

A polybutylene terephthalate melt of the type employed in Example III, i.e., having an intrinsic viscosity of 1.3 deciliters per gram, was formed into parisons and blow molded by the same procedure as employed in Example III except that the mold temperature was increased to 150°F. Good parison control was maintained during the test. The blow molded articles formed were shaped into bottles of the type employed in aerosol applications.

EXAMPLE V

A representative sample of bottles produced in Example III were tested to determine if they met the requirements of pressurized, aerosol filled bottles. The standard test for aerosol bottles is a drop impact test. In this test the blow molded bottle is dropped from varying heights. The bottles are dropped while filled with water, or alternatively, under pressure. The results of the test are reported as a height in feet. This height represents the maximum height at which the bottles do not break. Obviously, the greater the height required to break the bottle, the better is the bottle for aerosol bottle usage. Two values are reported, the first value, $F_0$, is the maximum height at which no bottle fails, i.e., cracking of any part of the bottle. The second reported value, $F_{50}$, is the maximum height at which 50% of the bottles remain unbroken.

Two values of $F_0$ and $F_{50}$ are usually reported. The first, representing the result of test performed immediately after bottle formation, yields information regarding the effectiveness of the blow molding operation.

The second set of $F_0$ and $F_{50}$ values represent values derived from a drop impact test performed a period of time after formation of the bottles. Typically, this second drop impact test is made 4 weeks after formation of the bottles. Since this second test is made to test the shelf-life characteristics of blow molded aerosol bottles, the bottles during the four week storage period are stored under pressure or filled with water. The bottles are then dropped in accordance with the procedure employed during the first drop impact test. This second drop impact test provides an excellent test of the suitability of the blow molded polybutylene terephthalate bottles for aerosol usage in view of the fact that aerosol bottles are typically stored under pressure for long periods of time.

In view of the fact that the drop impact test after four weeks yields a true indication of the suitability of blow molded bottles for use as a container for a pressurized aerosol fluid, it is the result of this test that determines the acceptability of this blow molded product. The acceptable height is generally taken to be 10 feet. In view of the statistical possibility that a random sample of bottles to be tested may contain one or two atypical bottles, this criteria is met if either the $F_0$ or the $F_{50}$ test results yields a value equal to or greater than 10 feet. Obviously, if more than half a sample fails the drop impact test this result indicates a characteristic of the total lot rather than untypical samples.

A sample of ten bottles formed in Example III were pressurized and drop impact tested immediately after formation. Of this ten bottle sample, none of the bottles failed at up to 13 feet. Fifty percent of the bottles survived a drop of 17 feet. A second sample of five bottles were pressurized and tested after four weeks of storage at room temperature. The $F_0$ value for this five bottle sample was 15 feet. That is, none of the bottles failed when dropped from a height of 15 feet. Fifty percent of the bottles, the $F_{50}$ result, survived a drop of 16½ feet.

The results of this test indicate that the bottles formed in Example III are suitable for use as aerosol bottles.

EXAMPLE VI

A sample of polybutylene terephthalate bottles formed in Example IV were subjected to the drop impact test described in Example V. A first sample of 10 bottles was pressurized and tested immediately after formation of the bottles. The $F_0$ and $F_{50}$ results were 7 feet and 11½ feet, respectively. A second sample of five bottles made in Example IV were pressurized immediately after formation and stored for 4 weeks at room temperature. At this time they were subjected to the drop impact test, yielding the following results: $F_0$ equal to 16 feet and $F_{50}$ equal to 16½ feet.

This test indicated the suitability of the bottles formed in Example IV for usage as aerosol bottles.

Examples V and VI indicate that a mold temperature of 150°F. or below is well within the allowable temperature range for producing blow molded bottles suitable for aerosol bottle usage.

EXAMPLE VII

A polybutylene terephthalate melt having an intrinsic viscosity of 1.38 deciliters per gram, as measured in orthochlorophenol at 25°C., was formed into blow molded bottles in accordance with the Example III procedure. The formed bottles were subjected to the drop impact test in accordance with the procedure enumerated in Example V. The drop impact test indicated the suitability of the bottles for aerosol usage.

This example indicates that although there is a lower limit, there is no upper limit on the intrinsic viscosity of the polybutylene terephthalate of the blow molded articles of the instant invention. The only limit is the ability to manufacture polybutylene terephthalate resin having an intrinsic viscosity in excess of that employed in the examples above.

The description of the preferred embodiment and the examples given above are meant to be illustrative of the scope and spirit of the instant invention. These preferred embodiments and examples will make apparent other embodiments and examples within the scope and spirit of the invention described herein. These preferred embodiments and examples, within the scope and spirit of the instant invention, are contemplated by this invention. Therefore, the invention should be limited only by the appended claims.

What is claimed is:

1. A polybutylene terephthalate blow molded article wherein said polybutylene terephthalate has an intrinsic viscosity in the range of 1.05 to 1.4 deciliters per gram measured in orthochlorophenol at 25°C.

2. A polybutylene terephthalate article in accordance with claim 1 wherein said polybutylene terephthalate has an intrinsic viscosity in the range of about 1.1 to 1.4 deciliters per gram measured in orthochlorophenol at 25°C.

3. A polybutylene terephthalate blow molded article in accordance with claim 1 wherein said article is a bottle.

4. A polybutylene terephthalate article in accordance with claim 3 wherein said bottle is an aerosol bottle.

* * * * *